(12) United States Patent
Solovianenko

(10) Patent No.: US 11,542,096 B2
(45) Date of Patent: Jan. 3, 2023

(54) AUTOMATIC SYSTEM AND METHOD FOR STORING MATERIALS AND ASSEMBLING PACKAGES THEREFROM

(71) Applicant: Sergey Vladimirovich Solovianenko, Moscow (RU)

(72) Inventor: Sergey Vladimirovich Solovianenko, Moscow (RU)

( * ) Notice: Subject to any disclaimer, the term of this patent is extended or adjusted under 35 U.S.C. 154(b) by 252 days.

(21) Appl. No.: 16/762,908

(22) PCT Filed: Nov. 21, 2017

(86) PCT No.: PCT/RU2017/000871
§ 371 (c)(1),
(2) Date: May 8, 2020

(87) PCT Pub. No.: WO2019/103637
PCT Pub. Date: May 31, 2019

(65) Prior Publication Data
US 2021/0171282 A1    Jun. 10, 2021

(51) Int. Cl.
*B65G 1/04* (2006.01)
*B65G 1/06* (2006.01)

(52) U.S. Cl.
CPC ........... *B65G 1/0464* (2013.01); *B65G 1/065* (2013.01)

(58) Field of Classification Search
CPC .............................. B65G 1/0464; B65G 1/065
See application file for complete search history.

(56) References Cited

U.S. PATENT DOCUMENTS 4,678,390 A     7/1987  Bonneton et al.
11,027,917 B2 * 6/2021  Beer .................... B65G 1/1373
(Continued)

FOREIGN PATENT DOCUMENTS

WO    WO 2012/127102 A1    9/2012

*Primary Examiner* — Saul Rodriguez
*Assistant Examiner* — Ashley K Romano
(74) *Attorney, Agent, or Firm* — John Alumit

(57) ABSTRACT

The invention relates to warehouse technology, and specifically, to systems of automatic storage, sorting, assembly and delivery of goods. The invention can be used in various automated storage facilities, remote sales systems, as well as automated retail stores. An automatic system comprises a plurality of places arranged in rows in two horizontal directions, perpendicular to each other, and serving to accommodate boxes for storing materials in vertical stacks. A transport network comprises first rail tracks arranged above the stacks of boxes and intended for the movement of mobile actuating devices along them, as well as second rail tracks arranged perpendicular to the first rail tracks and located below the latter for the movement of mobile transporting devices along them. The mobile transporting devices are intended for moving boxes placed onboard along the second rail tracks. The mobile actuating devices are provided with a transfer unit intended for removing/placing one upper box from the storage place or one box from the mobile transporting device onto a transporting platform intended for accommodating materials during the movement of the mobile actuating device, and a gripper intended for retrieving/placing material from/into a box. The transport network is organized in such a way that a window is arranged above each stack of boxes, allowing to retrieve the upper boxes from the stack through such window from above, and another window is arranged above each of the second rail tracks, allowing to retrieve the boxes located on the mobile transporting device through such window from above.

20 Claims, 9 Drawing Sheets

(56) References Cited

U.S. PATENT DOCUMENTS

2016/0145058 A1    5/2016  Lindbo
2018/0201443 A1*   7/2018  Yamagishi ........... B65G 1/0435

* cited by examiner ns and assembling
AUTOMATIC SYSTEM AND METHOD FOR STORING MATERIALS AND ASSEMBLING PACKAGES THEREFROM The proposed invention relates to warehouse equipment, and specifically, to systems for automatic storage, sorting, assembly and delivery of goods. The invention can be used in various automated storage facilities, remote sales systems (mail order and internet), as well as automated (automatic) retail stores (retail kiosks or pavilions).

The operations concerning storage of goods, their transportation and retrieval with the required content from the storage area, their assembly and preparation for further processing, as well as the processes of assembling packages therein are the most labor-consuming and expensive part of the supply chain for e-commerce, which utilizes a large fraction of manual labor.

During system operation, there is a need for storing boxes with goods, delivering them to an individual buyer, individual operator, or an automatic device in a certain sequence, so as to allow the buyer, operator or device to sequentially assemble the boxes necessary to complete the task. To carry out these processes, a human-operated equipment as well as manual labor are used, leading to a decreased density of stored goods within the storage system, and as a result, an increase in size thereof. It is desirable that the system can function without attracting manual labor to reduce operating expenses and human errors.

An overhead robot system for moving stackable objects is known, which is described in the published international application WO 2012/127102, B65G 1/04, 2012. The system comprises a portal unit configured to move above objects located within the storage area, a gripper attached to the portal unit and configured to move along the portal unit, and a control system for controlling movements of the portal unit and gripper.

The system further includes a platform which is adapted to be positioned near the gripper in the close proximity and below the object (stack of objects) held by the gripper to release one object from the gripper onto the platform, and carrying means for moving the object from the platform to the edge of the storage area. Carrying means include a transfer member for moving the object from the platform and a carrier that is attached to the portal unit and configured to move along the portal unit toward the position, where the gripper is located and further on, wherein said platform and said transfer member are connected with the carrier.

The main disadvantage of such system is the low efficiency thereof due to the presence of only one gripper.

A system for handling objects is known, which is described in the US 20170129703 application, B65G 1/04, 2017 and comprises two perpendicular sets of rails forming a grid over multiple stacks of containers. The system further comprises a plurality of first robotic devices for loading goods for operating on the grid above the stacks of containers.

Each load handling device includes a body mounted on wheels, a body having lifting means for lifting a container from a stack of containers, a first set of wheels adapted to engage with the rails of the first set of rails, and a second set of wheels adapted to engage with rails of the second set of rails. The first set of wheels is independently movable and controllable with respect to the second set of wheels, so that when in motion, only one set of wheels will come into contact with the grid at any time, thereby allowing moving the devices to enable moving the load along the rails, while controlling only the set of wheels engaged with the rails, in which a part of the stacks is configured to include containers with a larger cross-sectional area compared to the containers in the rest of the stacks.

The system further comprises at least one second robotic load handling device for operating on the grid and is configured to lift and move containers from inside of the stacks configured to accommodate large containers.

The disadvantage of this system is the complexity of the robotic devices comprising thereof and inability of assembling packages.

The technical result of the proposed invention consists in expanding the assortment of technical means of automatic systems for storing materials and assembling packages therefrom by completely eliminating manual labor.

The technical result further consists in an increase in productivity of the automatic system due to concurrent handling of boxes with materials and assembling packages.

The specified technical result is achieved due to the fact that the automatic system for storing materials and assembling packages therefrom comprises a first tier (level), which includes a plurality of places arranged in rows in two (first and second) horizontal directions perpendicular to each other and used to accommodate boxes. Plurality of boxes intended for storing materials as well as empty ones are arranged in these places in vertical stacks with a maximum height of n boxes, wherein box levels n and n−1 form an assembly area.

Furthermore, the first tier includes a first transport network, a plurality of mobile transporting devices, and a plurality of mobile actuating devices.

The first transport network, in turn, consists of a plurality of first rail tracks arranged horizontally along the first direction, which are located above the stacks of boxes and intended to move mobile actuating devices along them, and a plurality of second rail tracks arranged horizontally along the second direction, intended to move mobile transporting devices.

Mobile transporting devices are intended for each accommodating at least one box and moving said box to any place along the corresponding second rail tracks.

Each mobile actuating device has a transfer unit intended for removing/placing one upper box from the storage place or one box from the mobile transporting device, a transporting platform intended for placing materials thereon during movement of the mobile actuating device from the donor box to the target box in any place along the corresponding first rail tracks, and at least one gripper intended for taking material from the donor box or from the transporting platform and placing it onto the transporting platform or into the target box.

In the proposed invention, terms "first, second, etc." denote qualitative parameters indicating target or functional purpose, and not serial numbers. Furthermore, term "donor box" implies any box from which the material is retrieved, and term "target box" implies any box (including empty) into which the material is placed.

The first transport network is organized so that the second rail tracks are located below the first rail tracks with the possibility for the mobile transporting devices with boxes placed thereon to pass under the (first rail) tracks.

Furthermore, the first transport network is arranged in such a way that there is a window above each stack of boxes that allows retrieving or placing one upper box from the stack through such window from above, and moreover, there is a window above each of the second rail tracks that allows retrieving or placing boxes through such window from above from/onto the mobile transporting device.

In a particular embodiment, the grippers of the mobile actuating devices can be configured to retrieve materials from the boxes located in the assembly area.

In a specific embodiment, the automatic system can be supplemented with at least one first terminal intended for placing/retrieving materials into/from the system and located on the side of the box storage places, while at least one box in one storage place is configured to be moved toward the first terminal.

In another specific embodiment, the automatic system can be supplemented with at least one second terminal intended for placing/retrieving materials and/or boxes into/from the system and located on the side of the box storage places relative to the first rail tracks, wherein at least one set of second rail tracks is extended beyond the limits (external dimensions) of the box storage places toward the second terminal, and the mobile transporting device located on these second rail tracks is configured to be driven toward the second terminal.

In yet another specific embodiment, the automatic system can be supplemented with at least one third terminal intended for placing/retrieving boxes into/from the system from mobile containers and located on the outside of the box storage places, wherein at least one set of first rail tracks is extended beyond the limits (external dimensions) of the box storage places toward the third terminal. The third terminal is configured to allow placing mobile containers under the first rail tracks, arranged in such a way that there is a window above each mobile container allowing the mobile actuating device to retrieve/place one upper box from/into the mobile container.

The automatic system can also be supplemented with at least one second tier located above the first tier and comprising a plurality of places arranged in rows in two (first and second) horizontal directions perpendicular to each other, which serves to accommodate boxes. A plurality of boxes intended for storing materials, as well as empty ones, are arranged in these locations in vertical stacks with a maximum height of n boxes, wherein box levels n and n−1 form an assembly area.

Furthermore, the second tier includes a second transport network, a plurality of mobile transporting devices similar to the mobile transporting devices of the first tier, and a plurality of mobile actuating devices similar to the mobile actuating devices of the first tier.

The second transport network consists of a plurality of first rail tracks arranged horizontally along the first direction, located above the stacks of bins and intended for moving mobile actuating devices along them, and a plurality of second rail tracks arranged horizontally along the second direction of the rail tracks, intended for moving mobile transporting devices along them.

Moreover, the second transport network is arranged in such a way that the second rail tracks thereof are located below the first rail tracks thereof with the possibility for the mobile transporting devices with boxes placed thereon to pass under the first rail tracks of the second transport network.

Moreover, the second transport network is arranged in such a way that the horizontal rail tracks thereof correspond to the rail tracks of the first transport network, and furthermore, there is a window above each stack of boxes that allows retrieving or placing one upper box through such window from above from/onto the stack, respectively, and also, that there is a window above each of the second rail tracks that allows retrieving or placing boxes through such window from the top from the mobile transporting device or onto the mobile transporting device, respectively.

Moreover, the second transport network is arranged in such a way that instead of at least one second tier storage place, there is a window that allows retrieving or placing one upper box from or onto the stack of boxes of the underlying tier, respectively, or from or onto the mobile transporting device of the underlying tier, respectively.

The specified technical result of the method is achieved due to the fact that the boxes containing materials are arranged within the storage places in stacks with a maximum height of n boxes. The stacks of boxes are arranged in rows in two (first and second) horizontal directions perpendicular to each other, wherein box levels n and n−1 form an assembly area.

The mobile actuating devices are placed above the rows of stacks of boxes with the ability to move in the first horizontal direction. Each of them is configured to be capable of moving one upper box of the stack between the stacks of boxes or mobile transporting devices. Furthermore, the mobile actuating device is configured to move materials between the boxes located in the assembly area.

The mobile transporting devices intended for placing at least one box thereon are arranged between the rows of stacks of boxes with the possibility of moving in the second horizontal direction.

By using at least one first mobile actuating device, at least one first target box for assembling a package of materials is placed as an upper box in the assembly area. Assembling a package of materials is carried out by using at least one mobile actuating device by transferring materials from the donor boxes located in the assembly area into at least one target box.

In the specific embodiment of the method, at least one stack of boxes is completely or partially filled with empty boxes. An empty box is placed as a target box.

In another specific embodiment of the method, the mobile transporting devices are arranged in such a way that boxes placed thereon are located in the assembly area, wherein the target box is installed on the mobile transporting device.

By using the mobile transporting device, the target box is moved between the rows of mobile actuating devices, while assembling a package of materials is carried out using a variety of mobile actuating devices by transferring materials from the donor boxes into the target box. In doing so, the following occurs.

Upon completion of assembling by the first mobile actuating device, the mobile transporting device with the target box placed thereon is moved toward the second row of the stacks of boxes, above which the second mobile actuating device is located. Next, the second mobile actuating device is moved toward the donor box of the second row containing the selected material located in the assembly area. By using the second mobile actuating device, material is retrieved from the donor box of the second row and placed into the target box.

The steps for moving the materials into the target box are repeated enough times until all ordered materials from the second row are collected. The steps for moving the mobile transporting device between the rows of stacks of boxes and the steps for moving materials into the target box are repeated until the package of materials is completely assembled. Next, the mobile transporting device with the assembled package is moved for a subsequent unloading or temporary storage.

In the specific embodiment of the method, at least one second mobile actuating device is used to place at least one second target box for assembling the package of materials as an upper box in the assembly area, if it becomes necessary to unload the mobile actuating device overloaded with tasks or to multisequence the operations.

At least one first donor box containing materials from the first row of stacks is moved to the assembly area of at least one second row of stacks, while assembling of a package of materials is performed using a variety of mobile actuating devices by transferring materials from the first donor boxes into the second target boxes. In doing so, the following occurs.

By using the first mobile actuating device, at least one first donor box containing materials (of the same type, same name) from the first row of stacks is placed on at least one mobile transporting device. The mobile transporting device is moved toward at least one second row of stacks of boxes, above which the second mobile actuating device is located.

As will be shown further, several boxes (for example, three) can be placed on a mobile transporting device at the same time. Therefore, the first actuating device can sequentially place the first three donor boxes onto the mobile transporting device, and the mobile transporting device can take them to three rows provided with the second mobile actuating devices. By using the second mobile actuating device, the first donor box containing the materials is removed from the mobile transporting device and placed in the assembly area of the second row.

Next, by using the first and second mobile actuating devices, packages are assembled by moving materials from the first donor boxes into the first and second target boxes, respectively. Once the operation is completed, the first and second mobile actuating devices move the first and second target boxes with the assembled materials to perform subsequent steps, such as shipment, temporary storage or further handling of the package assembly order.

In yet another specific embodiment of the method, at least two mobile transporting devices are positioned in such a way that the boxes placed thereon are located in the assembly area, wherein the first target box is placed on the first mobile transporting device and the second target box is placed on the second mobile transporting device.

By using the first mobile actuating device, materials are transferred from the first donor box to the first and second target boxes. Assembling of a package of materials is performed by using the first mobile actuating device by transferring materials from the donor boxes to the first and second target boxes.

In the specific embodiment of the method, by using the first mobile actuating device, a box containing slow-moving goods located at the bottom of the stack is taken to the assembly area. To do this, the boxes from the same stack located above the specified box containing slow-moving goods are sequentially moved from this stack to free spaces available within other stacks.

Next, the box containing slow-moving goods is placed within an empty space in the assembly area of the first row. By using the first mobile actuating device, material is retrieved from the box containing slow-moving goods, and the box is immediately placed back at the bottom of the stack. The retrieved material is moved into the target box. The boxes removed from the stack are returned thereto in the reverse order.

In the particular embodiment of the method, the rows of stacks of boxes located along the first direction are divided into groups containing an equal number of rows of stacks of boxes. The assortment of materials is arranged to be the same for each group, wherein the assortment of each row of the stacks of boxes of one group is made identical to the corresponding row of the other group.

In the specific embodiment of the method, loading materials into the system is performed via the first terminal located on the side of the rows of box stacks storage places and equipped with a mechanism for moving at least one box from/to the terminal area located at the place of (instead of) the stack of one storage place.

To do this, by using the first mobile actuating device, an empty box is placed onto the movement mechanism. The empty box is moved from the terminal area to the first terminal. The box is filled with the material and moved to the terminal area. By using the first mobile actuating device, the box containing material is removed from the movement mechanism of the first terminal and moved to a predetermined location in one of the stacks.

In another specific embodiment of the method, loading materials into the system is performed via the second terminal located on the side of the rows of box stacks storage places relative to the first direction. The second terminal is designed in such a way that the mobile transporting device has the ability to be driven toward the second terminal. At least one empty box is placed onto the mobile transporting device, for example, by using the first mobile actuating device. The mobile transporting device is operated to move toward the second terminal.

Next, the box is filled with the material. The mobile transporting device is operated to move toward the first mobile actuating device. By using the first mobile actuating device, the box containing the material is removed from the mobile transporting device and moved to a predetermined location in one of the stacks.

In yet another specific embodiment of the method, loading materials into the system is performed via the third terminal located on the side of the rows of box stacks storage places relative to the second direction. Furthermore, the third terminal is designed in such a way that at least one mobile container can be placed therein for accommodating stacks of boxes within said container, while the mobile actuating device has the ability to be driven toward the third terminal above the mobile container.

The mobile container with stacks of boxes containing materials is placed in the third terminal. The mobile actuating device is operated to move toward the third terminal above the mobile container. By using the mobile actuating device, the upper box is removed from the mobile container and moved to a predetermined location in one of the stacks.

In a specific embodiment of the method, retrieval of the assembled packages of materials from the system is performed via the first terminal located on the side of the rows of box stacks storage places and equipped with a mechanism for moving at least one box from/to the terminal area located in the place of (instead of) a stack of one storage place.

To do this, by using the first mobile actuating device, a box with the assembled package of materials is delivered to the terminal area and lowered onto the movement mechanism. By using the movement mechanism, the box containing the package is moved from the terminal area to the first terminal for unloading.

In another specific embodiment of the method, retrieval of the assembled packages of materials from the system is performed via the third terminal located on the side of the rows of box stacks storage places relative to the second direction. Furthermore, the third terminal is designed in such a way that at least one mobile container can be placed therein to accommodate stacks of boxes within said container, while the mobile actuating device has the ability to be driven toward the third terminal above the mobile container.

An empty mobile container is installed in the third terminal. By using the first mobile actuating device, a box with the assembled package of materials is delivered to the third terminal and placed above the mobile container. By using the mobile actuating device, the box containing the package is lowered into the mobile container.

The foregoing is a summary of the invention and, thus, may contain simplifications, generalizations, inclusions and/or exclusions of the details; therefore, those skilled in the art should appreciate that this summary of the invention is illustrative only and does not imply any limitation.

For a better understanding of the substance of the proposed technical solution, a specific embodiment is described below, which is not a restrictive example of the practical implementation of an automatic system for storing materials and assembling packages therefrom in accordance with the proposed invention with the references to drawings, which show the following.

Figure 1:
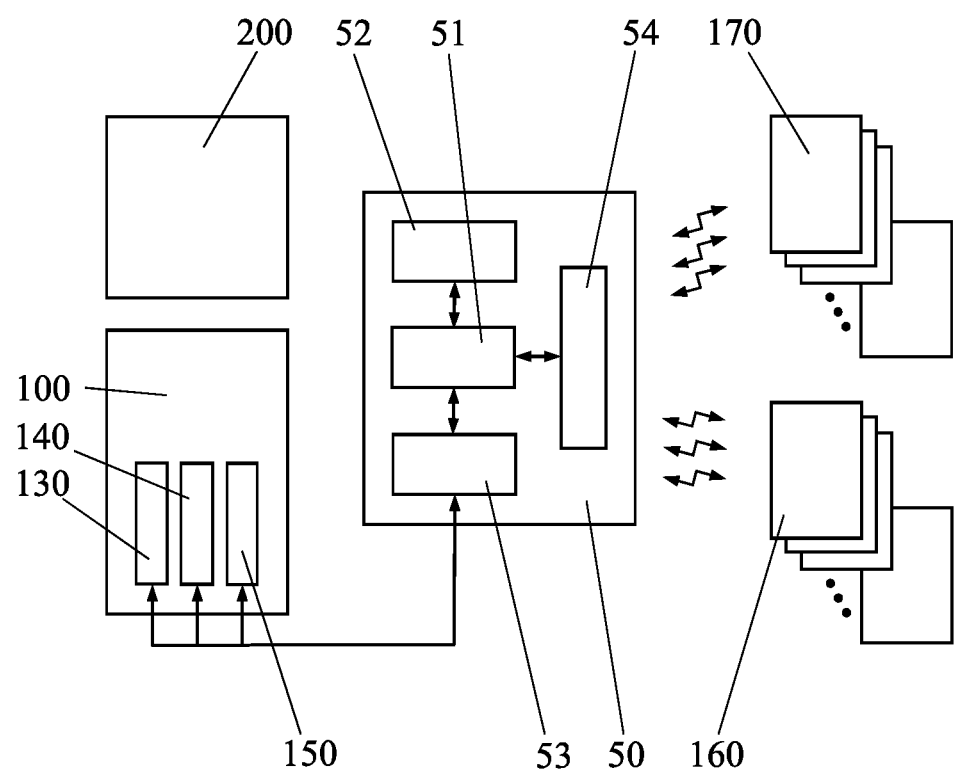
FIG. 1 shows a general diagram of the automatic system.

It should be noted that the drawings show only those details that are necessary for understanding the substance of the proposal, while related equipment, which is well known to those skilled in the art, is not shown in the drawings.

Figure 2:
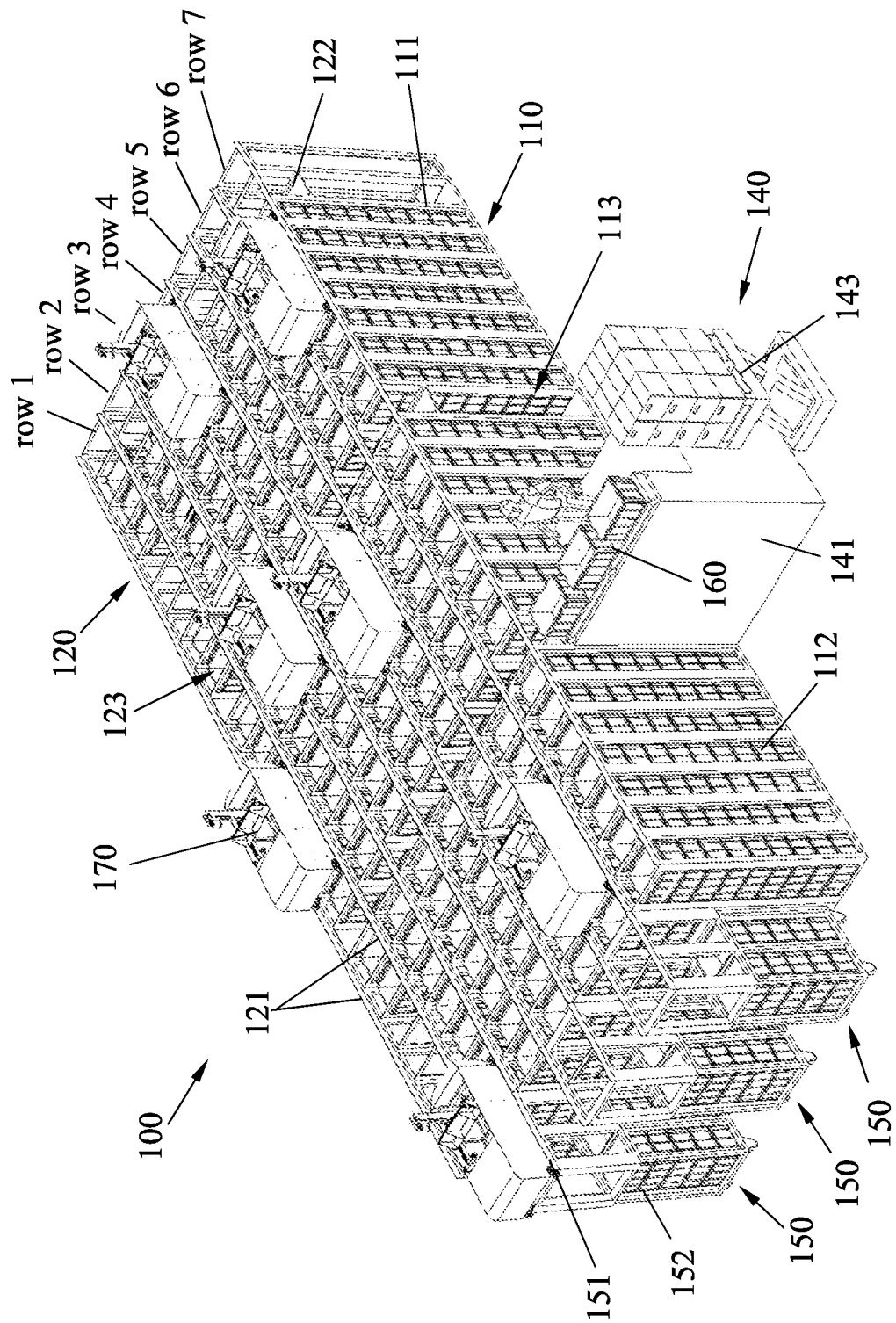
FIG. 2 shows an axonometric front view of the automatic system.
Figure 3:
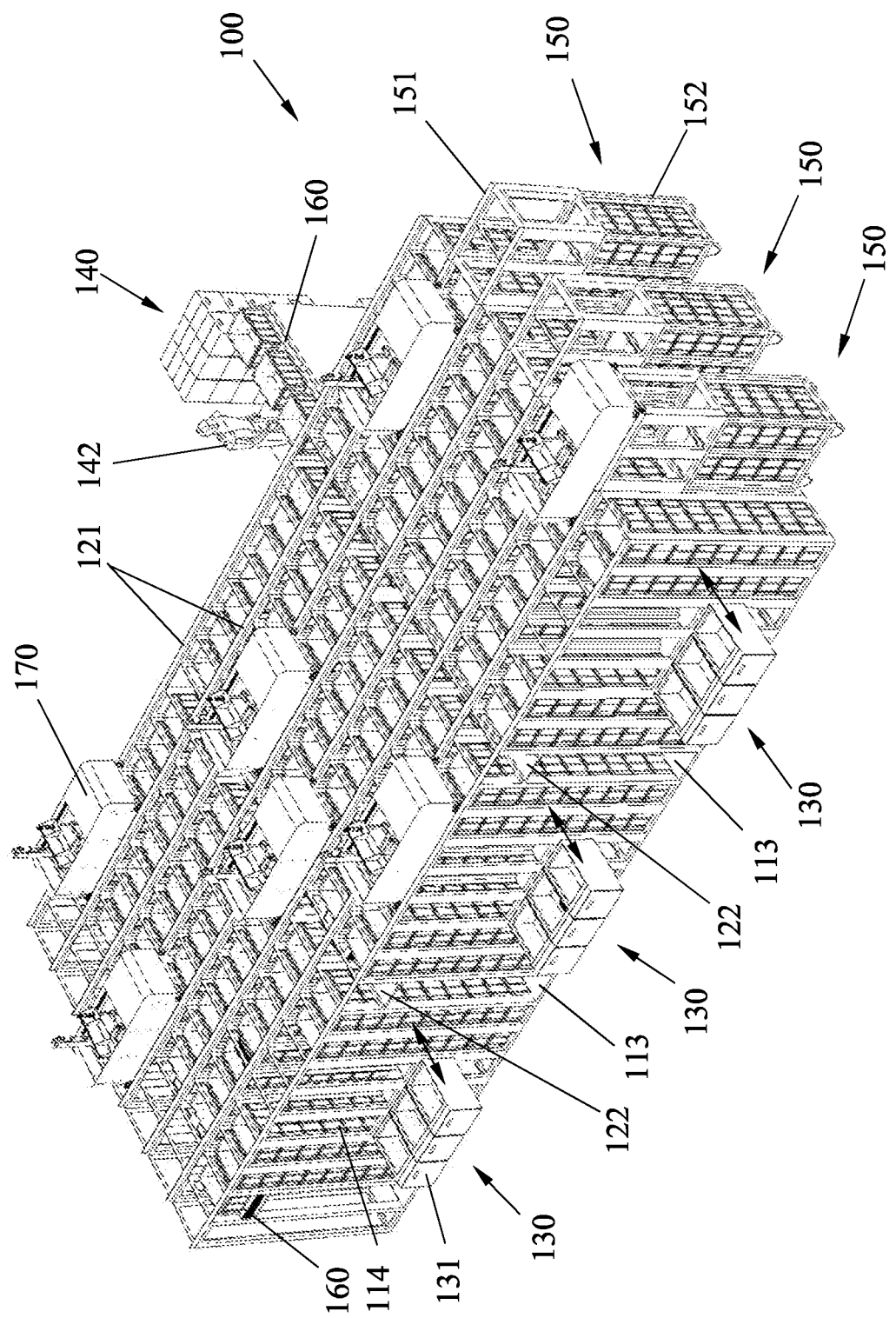
FIG. 3 shows an axonometric rear view of the automatic system.

As shown in FIGS. 1-3, the automatic system for storing materials and assembling packages therefrom comprises a control module 50, a first tier 100, and may also contain a second tier 200. Control unit 50 includes a central control processor 51, an order processing unit 52, an interface 53, and a wireless interface 54.

First tier 100 includes storage places 110, a first transport network 120, first terminals 130, a second terminal 140, and third terminals 150, as well as mobile transporting devices 160 (MTD) and mobile actuating devices 170 (MAD).

Storage places 110 represent a frame structure arranged in rows in two horizontal directions perpendicular to each other, forming vertical wells 111 with boxes 112 intended for storing various materials (goods, objects) arranged in stacks, i.e., one on top of the other. In this particular example, as shown in FIG. 2 and FIG. 3, the number of rows in wells 111, containing storage places and located along the first direction, is seven, and the total (maximum) height of the stack n is nine boxes 112. Levels n and n−1 (i.e., levels 9 and 8 in this example) form an assembly area.

Obviously, the number of rows, as well as their length, is determined by the size of the warehouse system, while the total height of the stack of boxes can vary depending on the specific purpose of the system and is determined mainly by its overall performance.

First transport network 120 includes the first rail tracks 121 and the second rail tracks 122. First rail tracks 121 are located above wells 111 of the frame structure of storage places 110 along the respective rows of wells and are intended for moving mobile actuating devices 170 along them. First rail tracks 121 together with the frame structure of storage places 110 form windows 123 through which, as will be shown later, boxes 112 can be lowered into or lifted from wells 111.

Second rail tracks 122 are intended for moving mobile transporting devices 160 along them and are located perpendicular to the first rail tracks 121 below them in passageways 113 arranged within the frame structure of storage places 110. Passageways 113 form windows above the second rail tracks 122, allowing retrieving or placing boxes through them from above from mobile transporting device 160 or onto mobile transporting device 160, respectively. It is generally possible to arrange the second rail tracks 122 relative to the first rail tracks at any height sufficient for the passage of mobile transporting devices 160 with boxes 112 placed thereon under the first rail tracks 121.

Loading and unloading materials into or from the system can be performed in three ways. For this, there are three types of terminals in the automatic system. First terminal 130 (FIG. 3) is located on the side of the box storage places relative to the first rail tracks 121 and embodied in the form of a hollow console 131 for placing boxes 112. Its main purpose is to deliver the finished assembled packages to customers within retail systems, as well as return the materials back to the storage system. For this, instead of stacks of boxes, there are terminal areas formed within the frame structure of the storage places in wells 114. Within wells 114, at a height convenient for a customer, there is a mechanism for moving box 112 from and back to the terminal area.

The box moving mechanism is activated by a drive controlled by central processor 51 of the automatic system. The number of terminals can be arbitrary, determined by the requirements of the system. In this particular example, there are nine first terminals 130, arranged in groups of three.

Second terminal 140 is located on the side of the box storage places relative to the first rail tracks 121 and embodied in the form of a pedestal 141 with an operating platform for accommodating maintenance personnel 142 and placing pallets 143 with materials from the suppliers. The second rail tracks extend beyond the limits of the frame structure of storage places 110 to pedestal 141 of the second terminal 140. Mobile transporting device 160 located on these rail tracks 122 can move out of the frame structure 11 of the storage places to the second terminal 140.

Personnel 142 unpacks the pallets and places the unpacked materials into empty boxes 112 installed on mobile device 160. Furthermore, second terminal 140 can also handle removal of empty or damaged boxes 112, as well as returned or damaged (expired) materials.

Third terminal 150 is located on the outside of the storage places 110 and embodied in the form of a console frame 151. First rail tracks 121 extend beyond the limits of storage places 110 onto frame 151. Under the console frame 151 of the third terminal 150, a mobile container 152 can be placed. In this mobile container 152, empty boxes 112 or boxes 112 with materials received from the suppliers for entering them into the automatic storage system may be located, or otherwise, containers 152 can be empty and used for removing boxes 112 from the system.

Rail tracks 121 on console frame 151 are arranged in such a way that there is a window above each mobile container that allows the mobile actuating device to retrieve/place one or more upper boxes from/into mobile container 152. In this particular example, three third terminals 150 are shown, which are arranged in the second, fourth and sixth rows.

Figure 4:
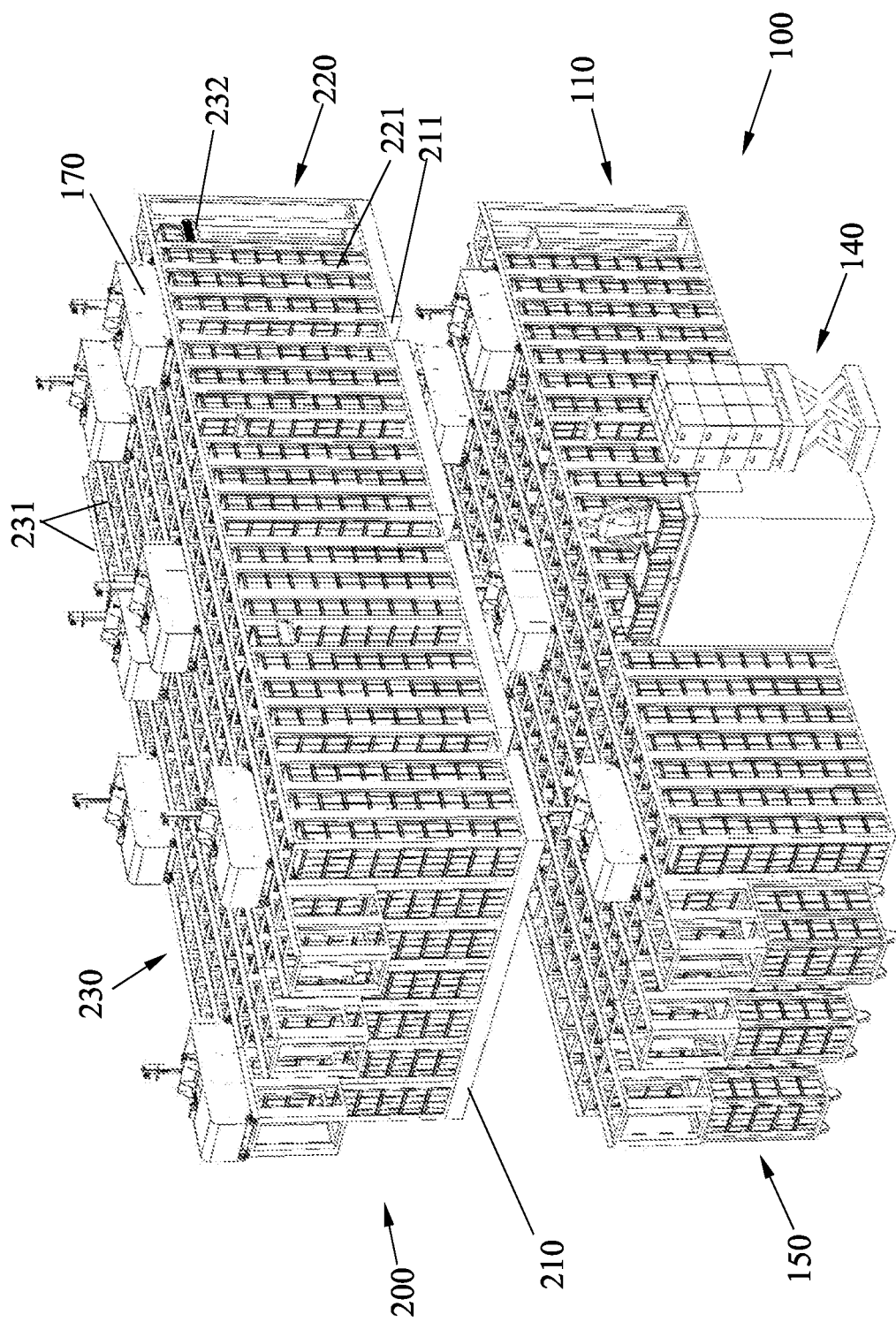
FIG. 4 shows an axonometric front view of the automatic system with two tiers.
Figure 5:
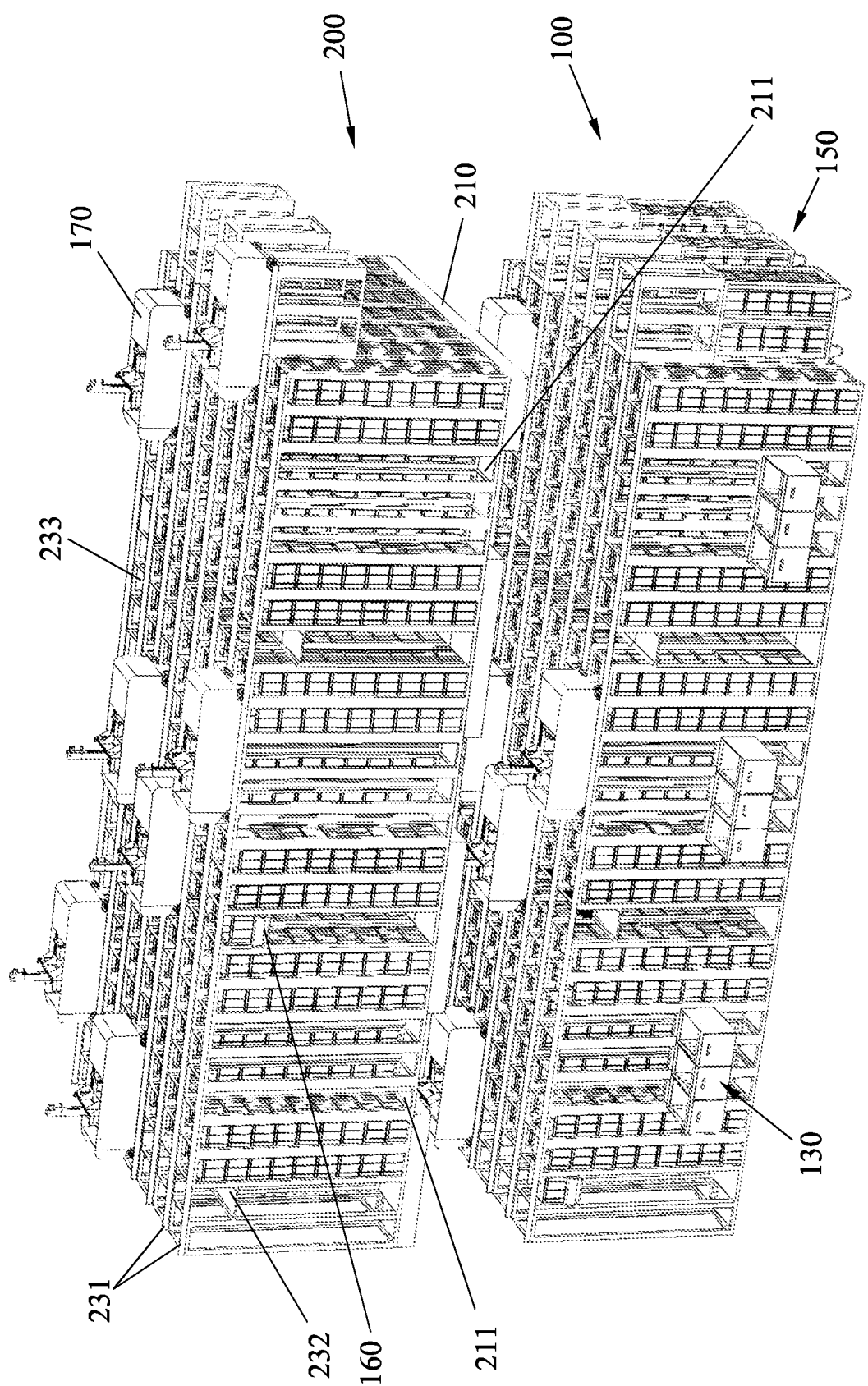
FIG. 5 shows an axonometric rear view of the automatic system with two tiers.

The automatic system can be multi-level. In this particular example, as shown in FIGS. 4 and 5, it is supplemented by a second tier 200 located above the first tier 100 on a beam 210 and comprises storage places 220, a second transport network 230, mobile transporting devices 160, and mobile actuating devices 170.

Storage places 220 represent a frame structure arranged in rows in two horizontal directions perpendicular to each other, forming vertical wells 221, with boxes 112 intended for storing various materials arranged in stacks, i.e., one on top of the other.

Second transport network 230 includes first rail tracks 231 and second rail tracks 232. First rail tracks 231 are located above wells 221 of the frame structure of the storage places 220 along the respective rows of wells and are intended for moving mobile actuating devices 170 along them. First rail tracks 231 together with the frame structure of the storage places 220 form windows 233 through which boxes 112 can be lowered into or lifted from wells 221.

Second rail tracks 232 are designed to move mobile transporting devices 160 along them and are located perpendicular to the first rail tracks 231 below them in passageways 222 arranged in the frame structure of storage places 220. Passageways 222 form windows above the second rail tracks 232, allowing retrieving or placing boxes through said windows from above from mobile transporting device 160 or onto mobile transporting device 160, respectively.

The location of the second rail tracks 232 relative to the first tracks 231 on the second tier is similar to the location of the second rail tracks 122 of the first tier and can be arranged at any height sufficient for the passage of mobile transporting devices 160 with boxes 112 placed thereon under the first rail tracks 231.

Second transport network 230 is arranged in such a way that the rail tracks thereof in the horizontal plane correspond to the rail tracks of the first transport network 120, i.e., they are located one above the other. Furthermore, windows 211 are arranged in place of some storage places 220 to allow retrieving or placing one upper box from or onto the stack of boxes of the first tier, respectfully, or from or onto the mobile transporting device of the first tier, respectively.

Figure 6:
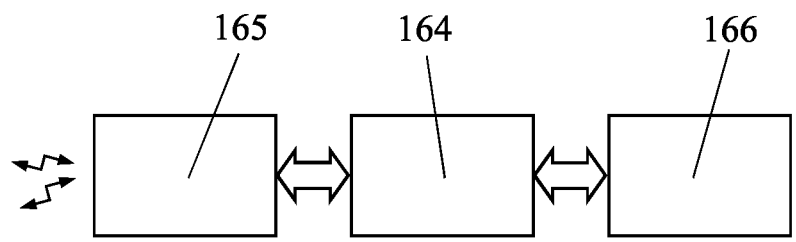
FIG. 6 shows a diagram of the mobile transporting device.
Figure 7:
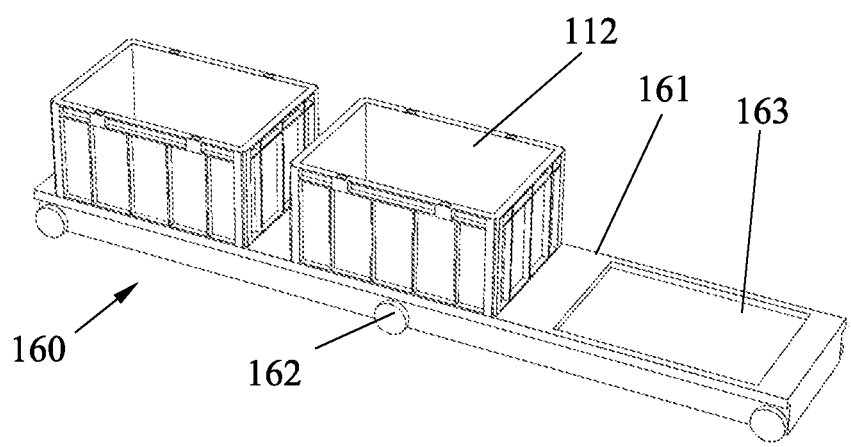
FIG. 7 shows a general view of the mobile transporting device.

As shown in FIGS. 6 and 7, mobile transporting device 160 comprises a body 161, intended to accommodate boxes 112, and drive wheels 162, intended to interact with the second rail tracks 122. Body 161 is provided with placement locations 163 for accommodating boxes 112. In this example, mobile transporting device 160 has three placement locations 163, wherein said placement locations 163 are designed so that they can be located precisely under the windows in rail tracks 121 of the respective rows. This makes it possible for three mobile actuating devices 170 to operate simultaneously with the mobile transporting device.

The mobile transporting device can be operated in any known manner. In particular, the operation can be performed by using a built-in industrial controller 164 having a wireless interface 165 for communicating with central processor 51 of the automatic system. Controller 164 operates drivers 166 of wheels 162 to enable movement along the second rail tracks 122 and provide accurate positioning relative to the first transport network 120.

Figure 8:
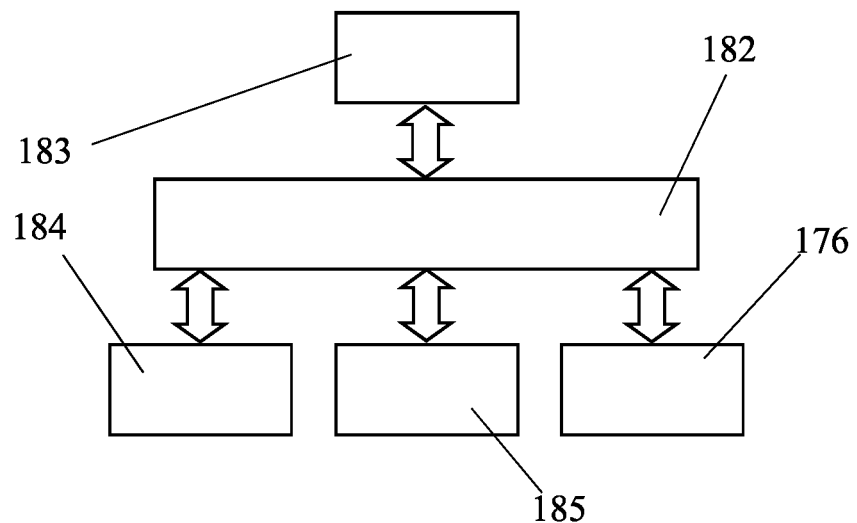
FIG. 8 shows a diagram of the mobile actuating device.
Figure 9:
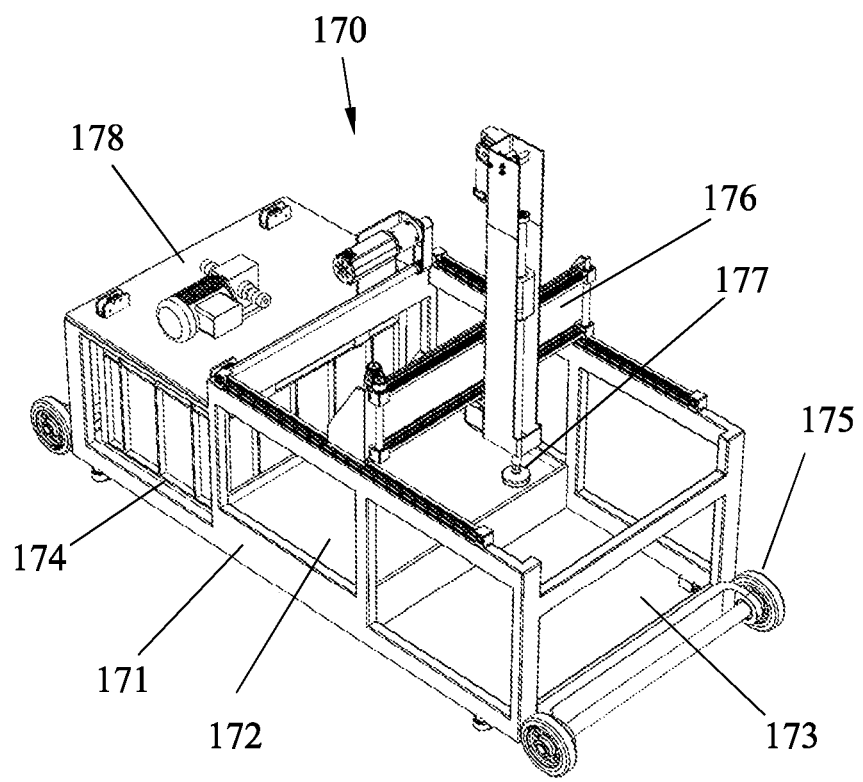
FIG. 9 shows the mobile actuating device in the transporting position.
Figure 10:
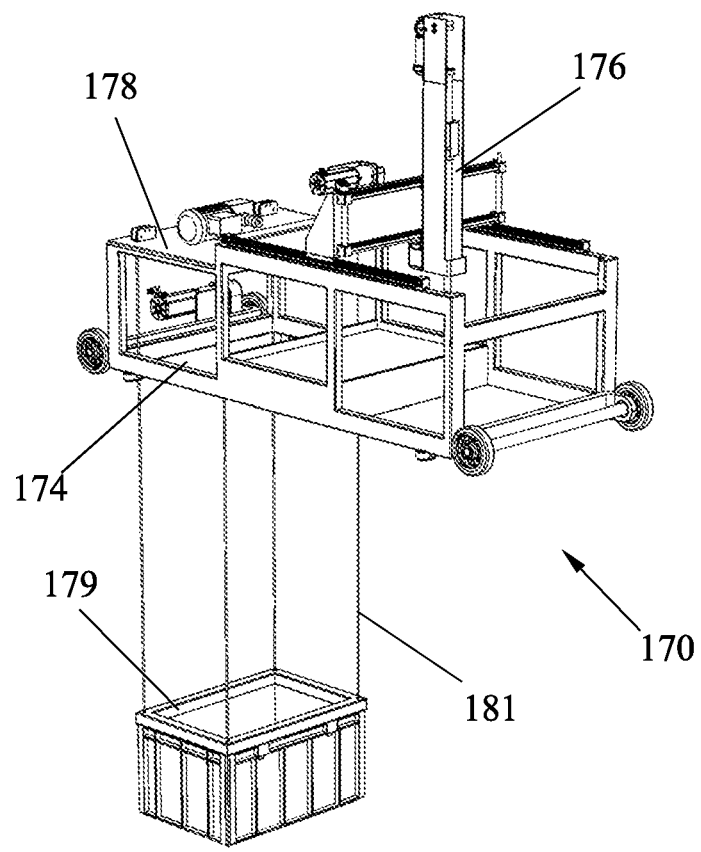
FIG. 10 shows the mobile actuating device in the operating position.

As shown in FIGS. 7 and 8, mobile actuating device 170 comprises a body 171 provided with a transporting platform 172 intended for placing materials during movement, a first window 173 and a second window 174. Furthermore, mobile device 170 includes drive wheels 175 intended for interaction with the first rail tracks 121, a three-axis manipulator 176 with a gripper 177 (for example, pneumatic) and a transfer unit 178 with a box gripper 179. The vertical movement of gripper 179 is realized by a drive 185 of transfer unit 178 using a cable system 181.

The mobile actuating device can also be operated in any known manner. In particular, a built-in industrial controller 182 having a wireless interface 183 for communication with central processor 51 of the automatic system can be used for such operation. Controller 182 operates drivers 184 of wheels 175 to enable the movement along the first rail tracks 121 and provide accurate positioning with respect to windows 123 and the second rail tracks 122 of transport network 120. Controller 182 also operates drive 185 of transfer unit 178.

Manipulator 176 is equipped with a computer vision system to accurately position gripper 177 relative to the required material located in boxes 112 or on transporting platform 172. Manipulator 176 is designed in such a way that gripper 177 can be lowered down to the second level from the top of the full stack of boxes 112 (in this particular example, box eight counting from the bottom), for example, by using a telescopic rod. Manipulator 176 is also operated by controller 182.

The initial loading of the automatic storage system can be performed in different ways, depending on its purpose. When using the automatic system as a large warehouse complex or the central distribution warehouse of the distribution network, it is advisable to carry out initial stocking through the second terminals 140 receiving materials packaged on pallets from the suppliers.

In this case, the system loading sequence is as follows:

Step 301. As previously indicated, personnel 142 fills the empty boxes placed on mobile transporting device 160 and the readiness message is transmitted to central processor 51 via interface 53.

Step 302. At the command from central processor 51, controller 164 operates drive 166 of wheels 162 in such a way that mobile transporting device 160 is moved along the second rail tracks 122 within passageway 113 of the storage places 110 and positioned so that boxes 112 filled with materials and placed thereon are located precisely under windows 123 of the first transport network 120 as specified by the central processor of the automatic system, for example, under rows 5, 6 and 7.

Step 303. At the commands from central processor 51 received via wireless interface 183, controllers 182 operate drivers 184 of wheels 175 so that mobile actuating devices 170 move along the first rail tracks 121 and stop so that grippers 179 are located precisely above boxes 112 placed on mobile transporting device 160.

Step 304. Controllers 182 of mobile actuating devices 170 operate the corresponding drive 185 of transfer unit 178 so that gripper 179 is lowered to capture the corresponding box 112 and then lifted through window 174 above the maximum level of the full stack of boxes, above the first rail tracks 121.

Step 305. Operated by controllers 182, mobile devices 170 with boxes 112 placed onboard are moved along the corresponding first rail tracks 121 to wells 111 of storage places 110 specified by central processor 51 of the automatic system, and are positioned by window 174 precisely above window 123 of the corresponding well 111.

Step 306. Controllers 182 of mobile actuating devices 170 operate the corresponding drive 185 of transfer unit 178 so that gripper 179 with box 112 can be lowered through window 174 into the corresponding well 111 to place the box on the bottom thereof or on top of box 112 already placed inside the well.

Step 307. Steps 301 through 306 are repeated until storage places 110 of the system are filled to the desired level.

When using the automatic system as a retail outlet of a sales network, it is advisable to carry out the initial stocking through the third terminals 150, which receive mobile containers 152 with boxes 112 filled with materials of the corresponding assortment at the central warehouse.

In this case, the system loading process includes the following sequence of steps:

Step 401. Mobile containers 152 are placed under the console frame 151 of the third terminal 150 and the readiness message is transmitted to central processor 51 via interface 53.

Step 402. At the commands from central processor 51 of the system transmitted via wireless interface 183, controllers 182 of mobile actuating devices 170 located on the first rail tracks 121 associated with the third terminals 150 (rows 2, 4, 6 in FIGS. 2 and 3) operate drives 184 of wheel 175 so that mobile devices 170 move along the first rail tracks 121 and stop so that grippers 179 are located precisely above boxes 112 located inside mobile containers 152.

Step 403. Controllers 182 of mobile actuating devices 170 operate the corresponding drive 185 of transfer unit 178 so that gripper 179 is lowered to capture the corresponding box 112 from container 152 and then lifted through window 174 above the maximum level of the full stack of boxes.

Step 404. Step 305 is performed.

Step 405. Step 306 is performed.

Step 406. Steps 402 through 405 are repeated until storage places 110 of the corresponding row are filled to the desired level.

If there is a need to fill up the rows of storage places 110 not associated with the third terminals 150, then the following steps are performed:

Step 407. At the command from central processor 51, controller 164 operates drive 166 of wheels 162 so that mobile transporting device 160 without boxes 112 is moved along the second rail tracks 122 within passageway 113 and positioned so that placement locations 163 are located precisely under windows 123 of the first transport network 120 as specified by the central processor of the automatic system, for example, under rows 2, 3 and 4.

Step 408. Controllers of the loaded mobile actuating devices 170 located on the first rail tracks 121 associated with the third terminals 150 (rows 2 and 4 in FIGS. 2 and 3) at the commands from central processor 51 of the system operate drives 184 of wheels 175 so that mobile devices 170 move along the first rail tracks 121 and are positioned by window 174 precisely above window 123 corresponding to placement location 163 of mobile transporting device 160.

Step 409. Controllers 182 of mobile actuating devices 170 (rows 2 and 4 in FIGS. 1 and 2) operate the corresponding drive 185 of transfer unit 178 so that gripper 179 holding box 112 is lowered through window 174 into the corresponding window 123 to place box 112 in placement location 163 of mobile transporting device 160. After that, controller 182 transmits a message to central processor 51 via wireless interface 183 about completing the operation.

Step 410. At the command of the central processor 51, controller 164 operates drive 166 of wheels 162 so that mobile transporting device 160 with boxes 112 is moved along the second rail tracks 122 within passageway 113 and positioned so that boxes 112 placed thereon are located precisely under windows 123 of the other rows, for example, under rows 5, 6 and 7 specified by central processor 51 of the automatic system.

Step 411. Controllers 182 of mobile actuating devices 170 located on the first rail tracks 121, not associated with the third terminals 150 (rows 5 and 7 in FIGS. 2, 3) at the commands from central processor 51 of the system operate drives 184 of wheels 175 so that mobile devices 170 move along the first rail tracks 121 and are positioned by window 174 precisely above window 123 corresponding to placement location 163 of mobile transporting device 160.

Step 412. Steps 304 through 306 are performed.

Steps 407 through 412 are repeated until storage places 110 of the corresponding row are filled to the desired level.

Placing materials into the automatic storage system, for example, when the material is returned at the retail outlet, can be performed via the first terminal. To do this, the following steps are performed:

Step 501. At the command from central processor 51, controller 182 operates drive 184 of wheels 175 so that mobile actuating device 170 is moved along the first rail tracks 121 to well 111 of storage places 110, in which a stack containing target box 112 (for example, empty) is located, and positioned by window 174 precisely above window 123 of well 111.

Step 502. Step 304 is performed.

Step 503. Operated by controller 182, mobile actuating device 170 with box 112 placed onboard is moved along the corresponding first rail tracks 121 to well 114 of the terminal area as specified by central processor 51 of the system and positioned by window 174 precisely above window 123 of this well.

Step 504. Controller 182 of mobile actuating device 170 operates drive 185 of transfer unit 178 so that gripper 179 holding box 112 is lowered through window 174 into well 114 to place the box on the movement mechanism of the first terminal 130.

Step 505. At the command from central processor 51 of the automatic system, the box moving mechanism pushes box 112 into the hollow console 131 of the first terminal 130.

Step 506. The returned material is placed in target box 112 and central processor 51 is notified via interface 53 of the completion of operation.

Step 507. At the command from central processor 51 of the automatic system, the movement mechanism of the first terminal 130 moves the target box to the terminal area of well 114. Central processor 51 is notified of the completion of operation.

Step 508. Steps 304 through 306 are performed.

If there is a need to remove target box 112 from another row or place it in a stack of another row, the steps similar to steps 407-412 are performed using the mobile transporting device.

Figure 11:
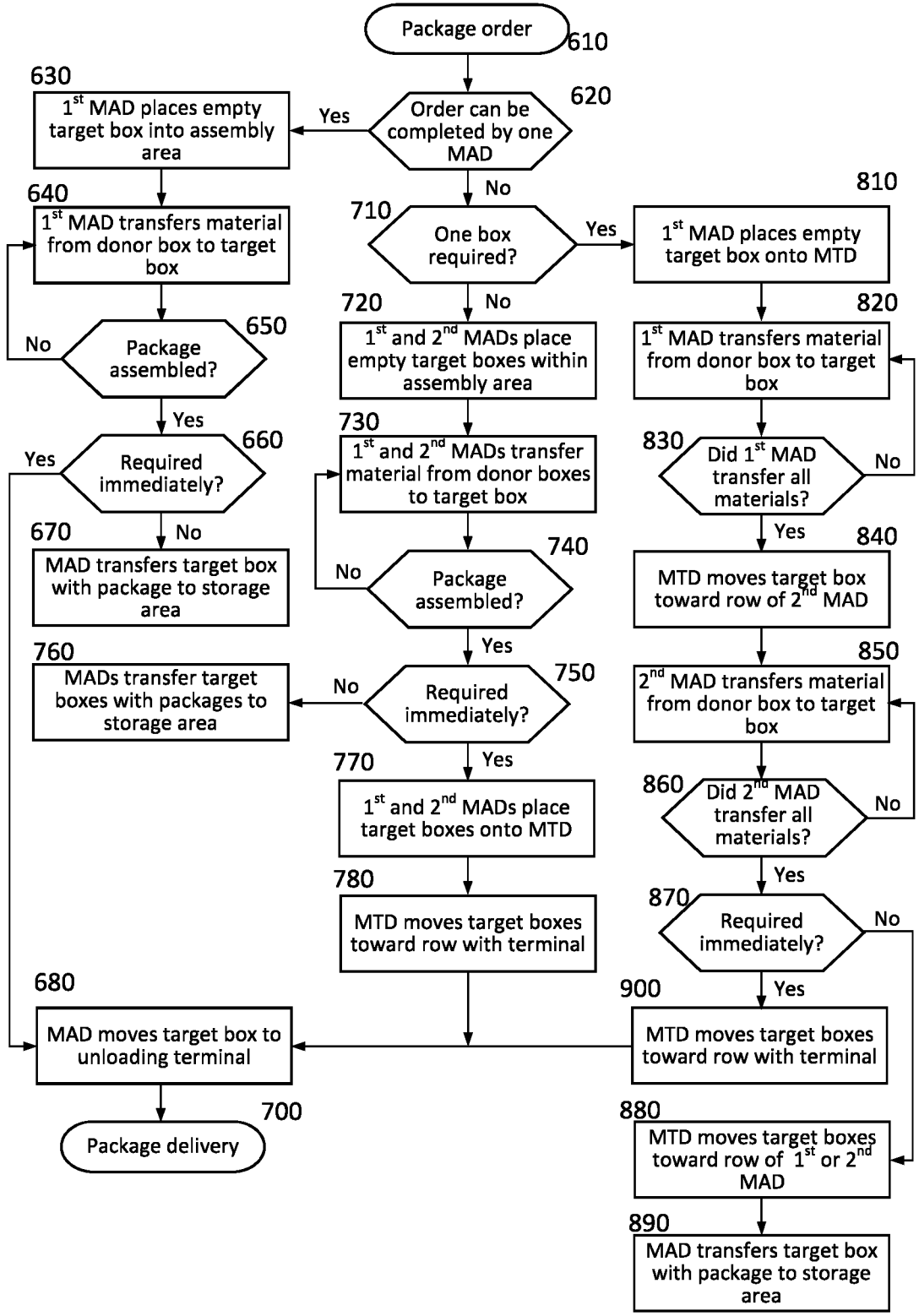
FIG. 11 shows a generalized block diagram of system operation.

A generalized process of assembling a set is shown in the form of a block-diagram in FIG. 11.

Step 610. The information about the need to assemble a package of materials is transferred to order processing unit 52 of control unit 50.

Step 620. Based on the obtained information, central processor 51 determines the possibility to complete the order by one of the first mobile actuating devices (MAD), i.e., whether all the ordered materials are within an assembly area thereof. If this is possible, then step 630 is performed, otherwise, step 710 is performed.

Step 630. First mobile actuating device 170 places empty target box 112 at the top of the stack of boxes in the middle of the assembly area. To do this, the following steps are performed:

Step 631. At the command form central processor 51, controller 182 operates wheel drive 184 in such a way that first actuating mobile device 170 is moved along the first rail tracks 121 to well 111 of the storage places 110 where a stack containing empty box 112 is located, and positioned by window 174 precisely above window 123 this well 111.

Step 632. Steps 304 through 305 are performed.

Step 633. Controller 182 of mobile actuating device 170 operates the corresponding drive 185 of transfer unit 178 so that gripper 179 holding empty target box 112 is lowered through window 174 into the corresponding well 111 to place the box on top of box 112 located in the well in the assembly area.

Step 640. After the empty target box is placed, the first mobile actuating device proceeds to assemble the set by transferring materials from the donor boxes to the target box. To do this, the following steps are performed:

Step 641. At the commands from central processor 51, controller 182 of the first mobile actuating device 170 operates drives 184 of wheels 175 so that mobile device 170 is moved along the first rail tracks 121 and positioned by window 173 precisely above window 123 corresponding to well 111 containing the box with the first ordered material. Moreover, this box should be in the assembly area.

Step 642. Controller 182 operates manipulator 176 equipped with the computer vision system in such a way as to place gripper 177 over the required material located in the donor box.

Step 643. Manipulator 176 using gripper 177 retrieves the material from the box and moves it to transporting platform 172.

Step 644. Controller 182 operates wheel drives 184 in such a way that mobile device 170 is moved along the first rail tracks 121 and positioned by window 173 precisely above window 123 corresponding to target box 112.

Step 645. Manipulator 176 using gripper 177 retrieves the material from the transporting platform 172 and moves it into the box designated for the ordered set, which is located on mobile transporting device 160.

Step 650. Next, the set assembly verification is performed. The verification can be performed by central processor 51 or controller 182 of the first mobile actuating device. If the set is assembled, then step 660 is performed, if not, then step 640 is performed.

Step 660. The need to deliver the assembled package is determined. If an immediate delivery is required, then perform step 680, if not, then perform step 670.

Step 670. Mobile actuating device 170 moves the box containing the assembled package to the temporary storage area. To do this, the following steps are performed:

Step 671. At the command from central processor 51, controller 182 operates wheel drive 184 in such a way that the first mobile actuating device 170 is positioned by window 174 precisely above target box 112 containing the assembled package.

Step 672. Steps 304 through 305 are performed.

Step 673. Controller 182 of mobile actuating device 170 operates drive 185 of transfer unit 178 so that gripper 179 holding target box 112 is lowered through window 174 into the corresponding well 111 to place the box on the bottom of the well or on top of box 112 located in the well for temporary storage.

Step 680. Mobile actuating device 170 moves the box containing the assembled package to an unloading terminal. During unloading at the first terminal 130, the following steps are performed:

Step 681. Step 671 is performed.

Step 682. For a box containing the set, steps 502 through 505 are performed.

When unloading in the third terminal 150, the following steps are performed:

Step 683. Mobile container 152 is placed under console frame 151 of the third terminal 150 and the readiness message is transmitted to central processor 51 via interface 53.

Step 683. Step 671 is performed.

Step 684. Step 304 is performed.

Step 685. At the commands from central processor 51 of the system, controller 182 operates drive 184 of wheels 175 so that mobile device 170 is moved along the first rail tracks 121 and stops so that window 174 is located precisely above window 123 of the third terminal 150.

Step 686. Controller 182 of mobile actuating devices 170 operates the corresponding drive 185 of transfer unit 178 so that gripper 179 holding target box 112 is lowered through window 174 and window 123 of the third terminal into the mobile container to place the box on the bottom of the container or on top of box 112 standing therein.

Step 700. The assembled package of materials is retrieved from the box in the first terminal 130 or the box containing the set is retrieved in the third terminal.

Step 710. Central processor 51 of the automatic system determines the number of boxes required to complete the order. If one box is required, then step 810 is performed, if more, then step 720 is performed.

Step 720. First and second mobile actuating devices 170 place empty target boxes 112 at the top of the stack of boxes in the middle of the corresponding assembly area. Furthermore, for each mobile actuating device, steps similar to steps 631-633 are performed.

Step 730. After the empty target boxes are placed, the first and second mobile actuating devices begin assembling the set by transferring materials from the donor boxes to the target box. Moreover, for each mobile actuating device, steps similar to steps 641-645 are performed.

Step 740. Next, the set assembly verification is performed. If the set is assembled, then step 750 is performed, if not, then step 730 is performed.

Step 750. The need to deliver the assembled package is determined. If an immediate delivery is required, then step 770 is performed, if not, then step 760 is performed.

Step 760. First and second mobile actuating devices 170 move the boxes with the assembled packages into the temporary storage area. Moreover, for each mobile actuating device, steps similar to steps 671-673 are performed.

Step 770. First and second mobile actuating devices 170 move the boxes with the assembled packages to mobile transporting device 160. To do this, the following steps are performed:

Step 771. First and second mobile actuating devices 170 with boxes 112 containing the assembled packages are moved along the corresponding first rail tracks 121 to mobile transporting device 160 and are positioned by window 174 precisely above placement locations 163.

Step 772. Controllers 182 of mobile actuating devices 170 operate the corresponding drives 185 of transfer unit 178 so that grippers 179 holding boxes 112 are lowered through window 174 into the corresponding window 123 to place box 112 in placement location 163 on mobile transporting device 160.

Step 780. Next, the boxes containing the assembled packages are moved to a row of the first rail tracks 121 associated with the unloading terminal. To do this, the following steps are performed:

Step 781. At the command from central processor 51, controller 164 operates drive 166 of wheels 162 in such a way that mobile transporting device 160 with boxes 112 is moved along the second rail tracks 122 within passageway 113 and positioned so that the first box 112 placed thereon is located precisely below window 123 of the row served by mobile actuating device 170 associated with the unloading terminal.

Step 782. Mobile actuating device 170 moves the first box containing the assembled package to the unloading terminal. In this case, actions consistent with steps 681-686 are performed.

Step 783. Mobile transporting device 160 is moved along the second rail tracks 122 within passageway 113 and positioned so that the second box 112 placed thereon is located precisely below window 123 of the row served by mobile actuating device 170 associated with the unloading terminal.

Step 784. Mobile actuating device 170 moves the second box containing the assembled package to the unloading terminal. Furthermore, actions consistent with steps 681-686 are performed.

Step 700 is performed.

Step 810. At the command from central processor 51, first mobile actuating device 170 places empty target box 112 intended for placing the ordered materials on mobile transporting device 160. To do this, the following steps are performed:

Step 811. At the command from central processor 51 of the system, controller 164 of mobile transporting device 160 operates wheel drive 166 so that mobile device 160 is moved along the second rail tracks 122 within passageway 113 and positioned so that placement location 163 is located precisely under windows 123 of that row of the first transport network 120, where the first mobile actuating device is located, for example, under row 2 (FIGS. 2 and 3).

Step 812. Step 631 is performed.

Step 813. Step 304 is performed.

Step 814. At the commands from central processor 51 of the system, controller 182 operates drives 184 of wheels 175 so that the first mobile device 170 is moved along the first rail tracks 121 and positioned by window 174 precisely above window 123 corresponding to placement location 163 of mobile transporting device 160.

Step 815. Controller 182 of mobile actuating device 170 operates drive 185 of transfer unit 178 so that gripper 179 holding empty target box 112 is lowered through window 174 into the corresponding window 123 to place box 112 in placement location 163 of mobile transporting device 160.

Step 820. After the empty target box is placed, the first mobile actuating device proceeds to assemble the set by transferring materials from the donor boxes to the target box. In this case, actions consistent with steps 641-645 are performed.

Step 830. Next, the set assembly verification is performed. If the first mobile actuating device 170 transferred all the materials, then step 840 is performed, if not, then step 820 is performed.

Step 840. After the work of the first mobile actuating device 170 is completed, mobile transporting device 160, at the command from central processor 51, moves the target box toward the row with the second mobile actuating device 170. To do this, the following steps are performed:

Step 841. Operated by controller 164, mobile transporting device 160 is moved along the second rail tracks 122 within passage 113 and positioned so that placement location 163 with target box 112 is located precisely under window 123 of that row of the first transport network 120 where the second mobile actuating device is located, for example, under row 3 (FIGS. 2 and 3).

Step 850. After the target box is moved, the second mobile actuating device 170 proceeds to assemble a set by transferring materials from the donor boxes to the target box. In this case, actions consistent with steps 641-645 are performed.

Step 860. Next, the set assembly verification is performed. If the second mobile actuating device 170 transferred all the materials (set assembly is completed), then step 870 is performed, if not, then step 850 is performed.

Step 870. The need to deliver the assembled package is determined. If an immediate delivery is required, then step 900 is performed, if not, then step 880 is performed.

Step 880. Mobile transporting device 160 moves the target box containing the assembled package to the row in which it will be temporarily stored, for example, next to the first mobile actuating device. To do this, the following steps are performed:

Step 881. Controller 164 operates the wheel drive 166 in such a way that mobile device 160 is moved along the second rail tracks 122 within passage 113 and positioned so that the placement location 163 with target box 112 is located precisely under window 123 of that row of the first transport network 120, where the first mobile actuating device is located (row 3 in FIGS. 2 and 3).

Step 890. First mobile actuating device 170 transfers the target box containing the set to the temporary storage area. To do this, the following steps are performed:

Step 891. At the commands from central processor 51 of the system, controller 182 operates drives 184 of wheels 175 so that the first mobile device 170 is moved along the first rail tracks 121 and positioned by window 174 precisely above target box 112 placed on mobile transporting device 160.

Step 892. Steps 672-673 are performed.

Step 900. Next, the boxes containing the assembled packages are moved to a row of the first rail tracks 121 associated with the unloading terminal. To do this, the following steps are performed:

Step 901. At the command from central processor 51, controller 164 operates drive 166 of wheels 162 so that mobile transporting device 160 with box 112 is moved along the second rail tracks 122 within passage 113 and positioned so that box 112 placed thereon is located precisely below window 123 of the row served by mobile actuating device 170 associated with the unloading terminal.

Step 902. Mobile actuating device 170 moves the first box containing the assembled package to the unloading terminal. In this case, actions consistent with steps 681-686 are performed.

Step 700 is performed.

During operation of the proposed system, a situation may arise according to which a significant portion of work associated with assembling orders will fall on one mobile actuating device 170, while the rest of the mobile actuating devices 170 will be idle. To ensure uniform loading of all devices in the system, the following actions are performed.

The first "overloaded" mobile actuating device 170, using the previously described operations, sequentially takes first several boxes 112, required to perform the priority tasks, and moves them to mobile transporting devices 160. Mobile transporting devices 160 move the first boxes placed thereon to the operating rows of the second mobile actuating devices 170, which, in turn, pick up the boxes and place them within their assembly areas. Next, the second mobile actuating devices 170 begin operating with the contents thereof, thereby unloading the "overloaded" device 170 and multi-sequencing the operations.

In the system, stored materials are ranked as fast-moving (i.e., which are constantly in high demand) and slow-moving (not ordered too offered). Fast-moving materials are stored in the upper levels of the bin storage stacks, while slow-moving materials are stored at the bottom of the storage system. Since it makes no sense to store slow-moving materials in the assembly areas due to the infrequent use thereof in the ordered packages, assembly of such materials is performed directly from the boxes which contain them, with their instant transfer back to the "bottom" of the system.

To do this, a universal mobile device 170 sequentially moves boxes located above box 112 containing slow-moving goods, which is specified by central processor 51, from a given stack to free locations available within other stacks.

Furthermore, universal mobile device 170 places the box containing slow-moving goods within empty location in the assembly area of its row. Using manipulator 176, material is retrieved from the box containing slow-moving goods and placed on transporting platform 172. Immediately after that, this box is placed back at the bottom of the stack. The retrieved material is placed into the target box. The boxes removed from the stack are returned thereto in the reverse order.

Although various aspects of realization of the proposed invention have been described herein, those skilled in the art will appreciate that other approaches to practicing this invention are possible. Various aspects and embodiments of the proposed invention are provided herein for illustrative purposes and do not imply any limitations, while the scope of protection of the proposed invention is disclosed in the following claims.

The invention claimed is:

1. An automatic system for storing materials and assembling packages therefrom, comprising:
   a first tier, which includes
      a plurality of storage places arranged in rows in two (first and second) horizontal directions, perpendicular to each other, and serving to accommodate boxes; and
      a plurality of boxes accommodated in these places in the form of vertical stacks with a maximum height of n boxes, wherein box levels n and n−1 form an assembly area;
   a first transport network, comprising
      a plurality of first rail tracks arranged horizontally along the first direction, located above the stacks of boxes and configured for moving a plurality of mobile actuating devices along them,
      a plurality of second rail tracks arranged horizontally along the second direction of the rail tracks and configured to move a plurality of mobile transporting devices along them; and
      said plurality of mobile transporting devices designed to each accommodate at least one box and move the accommodated box along the respective second rail tracks;
   said plurality of mobile actuating devices (170) are each provided with a transfer unit (178) adapted for moving one upper box of a stack of boxes between stacks or said plurality of mobile transporting devices (160),
      a transporting platform (172) adapted for placing materials while moving the mobile actuating device from a donor box to a target box along the respective first rail tracks, and
      at least one gripper (177) adapted for capturing material from the donor box or from the transporting platform and placing said material on the transporting platform or into the target box;
   wherein the first transport network is organized in such a way that
      the second rail tracks are located below the first rail tracks allowing for
      the passage thereunder of the plurality of mobile transporting devices with boxes placed thereon,
      a window is located above each stack of boxes allowing for moving one upper box through said window from above, while
      another window is located above each of the second rail tracks allowing for moving boxes from/to the mobile transporting device through said window from above.

2. The automatic system according to claim 1, characterized in that the grippers of the mobile actuating devices are configured to retrieve materials from the boxes located in the assembly area.

3. The automatic system according to claim 1, characterized in that said system is supplemented by at least one first terminal intended for loading/unloading materials into/from the system and located on the side of the box storage places, while at least one box of one storage place is configured to be moved toward the first terminal.

4. The automatic system according to claim 1, characterized in that said system is supplemented by at least one second terminal intended for loading/unloading materials and/or boxes into/from the system and located on the side of the box storage places relative to the first rail tracks, wherein at least one set of the second rail tracks is extended beyond the limits of the box storage places towards the second terminal, while the mobile transporting device located on these second rail tracks is configured to be driven toward the second terminal.

5. The automatic system according to claim 1, characterized in that said system is supplemented by at least one third terminal for intended for loading/unloading boxes into/from the system from the mobile containers and located on the outside of the box storage places, wherein at least one set of the first rail tracks extends beyond the limits of the box storage places toward the third terminal, while the latter is configured to accommodate mobile containers under the first rail tracks, organized in such a way that there is a window above each mobile container allowing the mobile actuating device to retrieve/place one or more of the top boxes from/into the mobile container.

6. The automatic system according to claim 1, characterized in that said system is supplemented by at least one second tier located above the first tier and comprising:
   a plurality of storage places arranged in rows in two (first and second) horizontal directions, perpendicular to each other, and serving for accommodating boxes;

a plurality of boxes placed within these places in the form of vertical stacks with a maximum height of n boxes, while box levels n and n−1 form an assembly area;
a second transport network, consisting of
  a plurality of first rail tracks arranged horizontally along the first direction, which are located above the stacks of bins and intended for moving mobile actuating devices along them;
  a plurality of second rail tracks arranged horizontally along the second direction, which are intended for moving mobile transporting devices along them;
  a plurality of mobile transporting devices similar to the mobile transporting devices of the first tier;
  a plurality of mobile actuating devices similar to the mobile actuating devices of the first tier;
  wherein the second transport network is organized in such a way that the second rail tracks thereof are located below the first rail tracks thereof allowing for the passage thereunder of the mobile transporting devices with boxes placed thereon,
  the rail tracks thereof in the horizontal plane correspond to the rail tracks of the first transport network,
  a window is located above each stack of boxes, allowing for moving one upper box through said window from above, and
  another window is located above each of the second rail tracks, allowing for moving boxes from/onto the mobile transporting device through said window from above, and
  instead of at least one storage place of the second tier, there should be a window allowing for moving one upper box from/onto the stacks of the first tier or from/onto the mobile transporting device of the underlying tier.

7. A method of storing materials and assembling packages therefrom within an automatic system, which consists in the following:
  Placing boxes containing materials at the storage places in stacks with a maximum height of n boxes, arranged in rows in two (first and second) horizontal directions, perpendicular to each other, wherein box levels n and n−1 form the assembly area;
  Placing mobile actuating devices above the rows of stacks of boxes, said mobile actuating devices being adapted to move along the first horizontal direction, each of which is configured to move one upper box of the stack between stacks of boxes or between mobile transporting devices, as well as to move materials between the boxes located in the assembly area;
  Placing mobile transporting devices between the rows of stacks of
    Boxes, said mobile transporting devices being adapted to move along the second horizontal direction,
    which are adapted for each accommodating at least one box;
  Placing at least one target box as an upper box in the assembly area to assemble a package of materials using at least one first actuating mobile device; and
  Assemblying a package of materials using at least one mobile actuating device by transferring materials from the donor boxes to at least one target box.

8. The method according to claim 7, further comprising the step of filling at least one part of at least one stack of boxes with empty boxes.

9. The method according to claim 7, further comprising the step of placing an empty box as the target box.

10. The method according to claim 7, further comprising the steps of
  Positioning the mobile transporting devices in such a way that the boxes placed thereon are located in the assembly area, while the target box is installed on the mobile transporting device;
  Moving the target box between the rows of mobile actuating devices using the mobile transporting device; and
  Assemblying a package of materials using a plurality of mobile actuating devices by transferring materials from the donor boxes to the target box.

11. A method according to claim 7, further comprising the steps of
  Using at least one second mobile actuating device to place at least one second target box as an upper box in the assembly area to assemble a package of materials;
  Moving at least one first donor box containing materials from the first row of stacks to the assembly area of at least one second row of stacks; and
  Assembling a package of materials using a plurality of mobile actuating devices by transferring materials from the first donor boxes to the second target boxes.

12. The method according to claim 11, further comprising the steps of moving the first donor box by placing it on the mobile transporting device by the first mobile actuating device, moving said mobile transporting device, and removing said donor box from said mobile transporting device by the second mobile actuating device.

13. The method according to claim 7, further comprising the steps of
  Positioning at least two mobile transporting devices in such a way that the boxes placed thereon are located in the assembly area, wherein the first target box is placed on the first mobile transporting device and the second target box is placed on the second mobile transporting device;
  Using the first mobile actuating device to transfer materials from the first donor box to the first and second target boxes; and
  Assemblying a package of materials using the first mobile actuating device by transferring materials from the donor boxes to the first and second target boxes.

14. The method according to claim 7, further comprising the steps of using the first mobile actuating device to deliver a box with slow-moving goods located at the bottom of the stack to the assembly area, which is achieved by:
  sequentially moving boxes located above said box with slow-moving goods from a given stack to available places in other stacks;
  placing said box with slow-moving goods within available place in the assembly area of the first row;
  using the first mobile actuating device to remove the material from said box with slow-moving goods and then immediately placing this box back at the bottom of the stack;
  transferring the removed material into the target box; and
  replacing the boxes taken out of the stack in the reverse order.

15. The method according to claim 7, further comprising the steps of
  Dividing the rows of stacks of boxes located along the first direction into groups containing an equal number of rows of stacks of boxes;

Assorting the materials in the same way for each group; while assorting each row of stacks of boxes of one group in an identical manner to the corresponding row of another group.

16. The method according to claim 7, characterized in that loading materials into the system is realized via the first terminal located on the side of the rows of box stacks storage places and provided with a mechanism for moving at least one box from/into the terminal area located at the place of a stack of one storage place, which is achieved by:

using the first mobile actuating device to place an empty box onto the movement mechanism;

moving the empty box from the terminal area to the first terminal;

placing the material into the box and moving it to the terminal area; and using the first mobile actuating device to remove the box with the material from the movement mechanism of the first terminal and moving this box to a predetermined place in one of the stacks.

17. The method according to claim 7, characterized in that loading materials into the system is realized via the second terminal located on the side of the rows of the box stacks storage places relative to the first direction in such a way that the mobile transporting device has the ability to be driven toward the second a terminal, which is achieved by:

moving the mobile transporting device with an empty box placed thereon toward the second terminal;

transferring the material in the box;

moving the mobile transporting device toward the first mobile actuating device; and using the first mobile actuating device to remove the box with the material from the mobile transporting device and move this box to a predetermined place in one of the stacks.

18. The method according to claim 7, further comprising the steps of loading materials into the system via the third terminal located on the side of the rows of the box stacks storage places relative to the second direction and arranging them in such a way that at least one mobile container for placing stacks of boxes can be installed therein, while the mobile actuating device has the ability to be driven toward the third terminal above the mobile container;

placing said mobile container with stacks of boxes of materials within the third terminal;

moving the mobile actuating device to the third terminal above the mobile container; and Using the mobile actuating device to retrieve the upper box from the mobile container and move this box to a predetermined place in one of the stacks.

19. The method according to claim 7, characterized in that unloading assembled packages of materials from the system is realized via the first terminal located on the side of the rows of box stacks storage places and provided with a mechanism for moving at least one box from/into the terminal area located at the place of a stack of one storage place, which is achieved by:

using the first mobile actuating device to deliver a box with assembled package of materials to the terminal area, where this box is lowered onto the movement mechanism; and using the movement mechanism to move the box with the package from the terminal area to the first terminal for unloading.

20. The method according to claim 7, further comprising the steps of unloading assembled packages of materials from the system via the third terminal located on the side of the rows of box stacks storage places relative to the second direction and realized in such a way that at least one mobile container for placing stacks of boxes can be placed therein, while the mobile actuating device has the ability to be driven towards the third terminal above the mobile container;

placing the mobile container in the third terminal;

using the first mobile actuating device to deliver the box with the assembled package of materials to the third terminal, where it is placed above the mobile container and lowering the box with the package into said mobile container.

* * * * *